US012508889B2

(12) United States Patent  
Björkman et al.

(10) Patent No.: US 12,508,889 B2  
(45) Date of Patent: Dec. 30, 2025

(54) WHEELBASE STRUCTURE

(71) Applicant: Volvo Truck Corporation, Gothenburg (SE)

(72) Inventors: Gunnar Björkman, Gothenburg (SE); Viktor Karlsson, Mölndal (SE)

(73) Assignee: Volvo Truck Corporation, Gothenburg (SE)

( * ) Notice: Subject to any disclaimer, the term of this patent is extended or adjusted under 35 U.S.C. 154(b) by 351 days.

(21) Appl. No.: 17/487,381

(22) Filed: Sep. 28, 2021

(65) Prior Publication Data

US 2022/0105815 A1    Apr. 7, 2022

(30) Foreign Application Priority Data

Oct. 6, 2020   (EP) .................................... 20200342

(51) Int. Cl.
| | | |
|---|---|---|
| *B60K 1/04* | (2019.01) | |
| *B60K 15/063* | (2006.01) | |
| *B60L 50/60* | (2019.01) | |
| *B60L 50/64* | (2019.01) | |

(52) U.S. Cl.  
CPC .............. *B60K 1/04* (2013.01); *B60K 15/063* (2013.01); *B60L 50/64* (2019.02); *B60L 50/66* (2019.02); *B60K 2001/0438* (2013.01); *B60K 2015/0636* (2013.01)

(58) Field of Classification Search  
CPC .............. B60K 1/04; B60K 2001/0438; B60K 2001/0405; B60L 50/66  
See application file for complete search history.

(56) References Cited

U.S. PATENT DOCUMENTS

| | | | | | |
|---|---|---|---|---|---|
| 4,881,756 | A | * | 11/1989 | Kumasaka | ............. B62D 65/04 |
| | | | | | 296/193.03 |
| 5,704,644 | A | * | 1/1998 | Jaggi | ....................... B60L 50/52 |
| | | | | | 280/783 |
| 5,833,023 | A | * | 11/1998 | Shimizu | .................. B60L 53/80 |
| | | | | | 180/68.5 |

(Continued)

FOREIGN PATENT DOCUMENTS

| | | |
|---|---|---|
| CN | 103730616 A | 4/2014 |
| CN | 105128644 A | 12/2015 |

(Continued)

OTHER PUBLICATIONS

Extended European Search Report for European Patent Application No. 20200342.2, mailed Mar. 1, 2021, 5 pages.

(Continued)

*Primary Examiner* — Paul N Dickson  
(74) *Attorney, Agent, or Firm* — Withrow & Terranova, PLLC

(57) ABSTRACT

The present invention relates to a wheelbase structure (configured to form at least a part of a vehicle main supporting structure by extending from a first axle to a second axle, the first and second axles being separated along a longitudinal direction. The wheelbase structure comprises an outer boundary forming an inner housing space for housing energy storage or transformation devices, wherein at least a portion of the outer boundary is formed by a sandwich structure comprising a plurality of layers of different material.

10 Claims, 3 Drawing Sheets

(56) References Cited

U.S. PATENT DOCUMENTS

| | | | |
|---|---|---|---|
| 6,040,080 A * | 3/2000 | Minami | H01M 50/202 |
| | | | 429/96 |
| 6,631,775 B1 * | 10/2003 | Chaney | B60L 53/80 |
| | | | 280/783 |
| 9,168,818 B2 * | 10/2015 | Hirai | B60K 17/356 |
| 10,421,345 B2 | 9/2019 | Kerspe et al. | |
| 10,479,413 B1 * | 11/2019 | Woods | B62D 29/005 |
| 10,632,827 B2 | 4/2020 | Ajisaka | |
| 10,710,638 B2 | 7/2020 | Kawase et al. | |
| 2005/0274556 A1 * | 12/2005 | Chaney | B60K 6/28 |
| | | | 180/68.5 |
| 2009/0197166 A1 | 8/2009 | Horii et al. | |
| 2010/0163322 A1 * | 7/2010 | Stefani | B60L 15/20 |
| | | | 180/65.21 |
| 2011/0095574 A1 | 4/2011 | Brown | |
| 2012/0183828 A1 * | 7/2012 | van den Akker | B60K 1/04 |
| | | | 429/100 |
| 2015/0175210 A1 * | 6/2015 | Raymond | B62D 25/02 |
| | | | 29/897.2 |
| 2017/0025655 A1 * | 1/2017 | Klimek | H01M 50/24 |
| 2017/0305249 A1 | 10/2017 | Hara | |
| 2018/0105062 A1 * | 4/2018 | Fees | H01M 50/298 |
| 2018/0108890 A1 * | 4/2018 | Fees | H01M 2/1077 |
| 2018/0109016 A1 * | 4/2018 | Fees | H01R 11/281 |
| 2018/0183114 A1 | 6/2018 | Rittner et al. | |

FOREIGN PATENT DOCUMENTS

| | | |
|---|---|---|
| CN | 110212126 A | 9/2019 |
| DE | 102010024320 A1 | 12/2011 |
| DE | 102011018960 A1 | 10/2012 |
| DE | 102015205413 A1 | 9/2016 |
| DE | 202015510422 U1 | 11/2016 |
| DE | 202016006076 U1 | 12/2016 |
| DE | 102016113759 A1 | 4/2017 |
| DE | 102017000263 A1 | 7/2017 |
| DE | 102016103411 A1 | 8/2017 |
| DE | 102016204223 A1 | 9/2017 |
| DE | 102017111020 A1 | 11/2018 |
| DE | 102017117726 A1 | 2/2019 |
| DE | 102017217960 A1 | 4/2019 |
| DE | 102018209113 B3 | 11/2019 |
| DE | 102018113812 A1 | 12/2019 |
| EP | 3427986 A1 | 1/2019 |
| GB | 1377729 A | 12/1974 |
| GB | 201014582 A | 3/2012 |
| SE | 1851009 A1 | 2/2020 |
| SE | 1851541 A1 | 6/2020 |
| WO | 2012117204 A1 | 9/2012 |
| WO | 2013188967 A1 | 12/2013 |
| WO | 2015150111 A1 | 10/2015 |
| WO | 2018210423 A1 | 11/2018 |

OTHER PUBLICATIONS

First Office Action for Chinese Patent Application No. 202111143846.7, mailed Jul. 29, 2023, 20 pages.
Chen, B. et al., "Stamping Forming Process and Product Inspection of Automotive Covering Parts," Southwest Jiaotong University Press, Jul. 31, 2015, 9 pages.
Liu, T. et al., "Automobile Culture," Beijing Institute of Technology Press, Apr. 30, 2012, 15 pages.
Second Office Action for Chinese Patent Application No. 202111143846.7, mailed Jan. 26, 2024, 24 pages.
Baumeister et al., "Applications of aluminum hybrid foam sandwiches in battery housings for electric vehicles," Procedia Materials Science, vol. 4, Dec. 2014, pp. 317-321.
Decision of Rejection for Chinese Patent Application No. 202111143846.7, mailed Jun. 4, 2024, 13 pages.
Communication of a notice of opposition for European Patent Application No. 20200342.2, mailed Apr. 18, 2024, 70 pages.
Interlocutory Decision in Opposition Proceedings for European Patent Application No. 20200342.2, mailed Oct. 22, 2025, 61 pages.

* cited by examiner

WHEELBASE STRUCTURE

RELATED APPLICATIONS

The present application claims priority to European Patent Application No. 20200342.2, filed on Oct. 6, 2020, and entitled "WHEELBASE STRUCTURE," which is incorporated herein by reference in its entirety.

TECHNICAL FIELD

The present invention relates to a wheelbase structure configured to form at least a part of a vehicle main supporting structure, and to a vehicle.

BACKGROUND

A vehicle typically comprises an engine for propelling the vehicle. The engine may be powered by various means, such as e.g. by a liquid or gaseous fuel in an internal combustion engine, or by electric power in an electric machine. Moreover, hybrid solutions exist in which the vehicle is propelled both by an internal combustion engine and an electric machine. In either way, energy storage or transformation devices are used to power the engine or electric machine. Moreover, fuel cells, together with a gas tank supplying a suitable gas to the fuel cell, may be used to propel the vehicle.

The energy storage or transformation devices, (e.g. batteries, gas tanks or fuel cells), for heavy commercial vehicles may be relatively large and have a weight of several hundred of kg. As space and weight requirements are important for vehicles, the assembly and arrangement of the energy storage or transformation devise relative the vehicle is of great importance.

For example, batteries, being one type of energy storage or transformation devices, are today often attached to the vehicle by a ladder frame with large brackets used to fixate the heavy batteries. Such ladder frame is often rigidly connected to the vehicle main supporting structure of the vehicle for improved strength and stiffness, as well as providing sufficient crash resistance. Both the ladder frame and the large brackets add to the weight of the vehicle.

Moreover, the vehicle main supporting structure, typically comprising a vehicle frame, is weighty and spacious. In order to utilize the space of the vehicle in an efficient manner, the part of the vehicle main supporting structure formed between the front and rear axles, i.e. a wheelbase structure, is often used for attachment to the ladder frame and the energy storage or transformation devices.

However, there is still a need in the industry for an improved way to house the energy storage or transformation devises in the vehicle.

SUMMARY

It is an object of the present disclosure to at least partly alleviate the shortcomings discussed above in relation to known wheelbase structures and housing of the energy storage or transformation devices, and to improve a wheelbase structure forming a part of the vehicle main supporting structure of a vehicle.

According to at least a first aspect of the present invention, a wheelbase structure configured to form at least a part of a vehicle main supporting structure by extending from a first axle to a second axle, the first and second axles being separated along a longitudinal direction, is provided. The wheelbase structure comprises:

an outer boundary forming an inner housing space for housing energy storage or transformation devices, wherein at least a portion of the outer boundary is formed by a sandwich structure comprising a plurality of layers of different material.

Hereby, an improved wheelbase structure for housing energy storage or transformation devices is provided. Thus, the object of the present invention is at least achieved by the first aspect of the present invention. By enabling the wheelbase structure, i.e. the part of the vehicle main supporting structure extending between first and second axles, to form an inner housing space for housing energy storage or transformation devices by an outer boundary formed, at least partly, by a sandwich structure, a low weight and cost-efficient solution is provided, while still providing a sufficient strength and crash resistant structure. Thus, the sandwich structure, being of relatively low weight but yet strong and having a high impact resistance, forms at least a portion of the wheelbase structure, while also providing for the inner housing space and the housing of the energy storage or transformation devices. Hereby, any ladder frame or large brackets used to fixate the energy storage or transformation devices may be omitted. Also, the assembly, or installation of the energy storage or transformation devices, to the vehicle is improved, as the energy storage or transformation devices may simply be housed in the inner housing space, with a minimum of external attachment means. A further advantage, any supporting frame between the first and second axles may be omitted owing to the strength and crash resistance of the wheelbase structure of the first aspect of the invention.

It should be understood that the wheelbase structure is configured to extend from the first axle to the second axle, the first axel being e.g. a front axle, and the second axle being a rear axle. However, the wheelbase structure may extend between any two axels being separated along the longitudinal direction. The wheelbase structure forms a part or portion of the vehicle main supporting structure, or chassis, i.e. the vehicle structure to which other components are attached. The main vehicle supporting structure may be frame-based, and the wheelbase structure may thus form a part or portion of the vehicle frame. The wheelbase structure may e.g. rigidly connect a first axle housing and a second axle housing. The vehicle main supporting structure, and thus at least partly the wheelbase structure, serve at least two main functions of the vehicle: to support the vehicle's mechanical components and vehicle body; and to deal with static and dynamic loads, without undue deflection or distortion. For example, it is typically arranged and configured to handle the weight of the vehicle body, any passengers, and cargo loads, handle vertical and torsional twisting transmitted by uneven surfaces, transverse lateral forces caused by road conditions, side wind, and steering the vehicle, torque from the engine and transmission, longitudinal tensile forces from starting and acceleration, as well as compression from braking, and sudden impacts from collisions.

The energy storage or transformation devices which the wheelbase structure is arranged and configured to house, may e.g. be, or comprise, batteries, fuel tanks, such as gas or liquid containers, or fuel cells.

According to at least one example embodiment, at least a part of the wheelbase structure is configured to form a floor of the vehicle, e.g. the floor of a bus. According to at least one example embodiment, the wheelbase structure has a main extension in a longitudinal direction along a longitudinal axis, preferably, when installed in a vehicle, coinciding with the longitudinal direction and longitudinal axis of the vehicle.

According to at least one example embodiment, the outer boundary of the wheelbase structure is the outer boundary of the inner housing space. The inner housing space may according to at least one example embodiment be configured to extend from the first axle to the second axle, or at least along a majority, e.g. at least 90%, of the distance between the first and second axles. According to an alternative embodiment, the inner housing space may extend along only a portion, e.g. less than 50% of the distance between the first and second axles. Thus, the wheelbase structure may comprise additional parts or portions configured to extend between the first and second axles, which are separated from the outer boundary. However, according to at least one example embodiment, the outer boundary of the wheelbase structure is configured to extend from the first axle to the second axle. In either wall, the outer boundary may comprise a plurality of wall portions, wherein at least one wall portion is, or comprises, said portion formed by the sandwich structure. According to at least one example embodiment, the outer boundary is formed by the sandwich structure. That is, the complete outer boundary is formed by the sandwich structure.

According to at least one example embodiment, said portion formed by the sandwich structure extends in the longitudinal direction along at least a majority of the wheelbase structure, such as along at least more than 50% of the wheelbase structure.

Hereby, the advantageous effects of the sandwich structure may be utilized to a large extent. According to at least one example embodiment said portion formed by the sandwich structure extends in the longitudinal direction along at least a majority of the wheelbase structure, such as along at least more than 60%, or 70%, or 80%, or 90% of the wheelbase structure.

According to at least one example embodiment, the outer boundary comprises at least a bottom wall for supporting the energy storage or transformation devices, and top wall for sealing the inner housing space and a side wall arranged between the bottom wall and top wall and extending in the longitudinal direction, wherein at least the side wall comprises, or is formed by, said portion formed by the sandwich structure.

Hereby, a simply but yet effective configuration of the outer boundary and the inner housing space is provided. Thus, the inner housing space is adapted for the housing of the energy storage or transformation devices. For example, the outer boundary may be rectangularly shaped, or be box-shaped. The side wall may e.g. be a circumferentially arranged side wall, built up by four side walls, or side wall portions, connected to each other by perpendicular corners. According to at least one example embodiment, the outer boundary is cylindrically shaped, and forms a cylindrically shaped inner housing space. According to at least one example embodiment, the complete side wall, or all side walls, are formed by the sandwich structure. According to at least one example embodiment, one or both of the bottom wall and top wall are formed by the sandwich structure.

According to at least one example embodiment, the wheelbase structure comprises an impact protection element arranged externally of the side wall.

Such impact protection element further improves the strength and crash resistance of the wheelbase structure. The impact protection element may furthermore be arranged and configured to transfer loads from the first axle to the second axle.

For embodiments in which the side wall comprises several side walls, or several side wall portions, at least two of the side walls or side walls portion may be equipped with an impact protection element. The impact protection element may e.g. have an elongated structure, and may preferably be made out of a metal or metal-composite material.

According to at least one example embodiment, the wheelbase structure comprises at least one internal wall separating the inner housing space into separate housing compartments.

Hereby, a simple but yet effective segmentation of the inner housing space is provided. For example, the separate housing compartments may be sized and dimensioned to house an individual energy storage or transformation device. The internal wall may e.g. be arranged in the longitudinal direction of the wheelbase structure, or may be arranged traverse the longitudinal direction of the wheelbase. By providing such segmentation of the inner housing space, the energy storage or transformation devices inside the inner housing space may be advantageously distributed related to e.g. crash energy.

According to at least one example embodiment, the at least one internal wall is arranged and configured to form an internal channel for cabling and/or heat transfer piping for the energy storage or transformation devices.

Hereby, a simple but yet effective segmentation of the inner housing space to provide for connection capabilities is provided. The at least one internal wall may be at least two internal walls, or may be an internal wall having wall portions arranged both in the longitudinal direction of the wheelbase structure and travers the longitudinal direction. The internal channel may additionality be configured for routing between the front and rear part of the vehicle (adapted for any media, e.g. electrical, pneumatic or hydraulic).

According to at least one example embodiment, the internal channel is forming a part of a pre-loaded module comprising cabling and/or heat transfer piping and a connection interface configured to connect the cabling and/or heat transfer piping to the energy storage or transformation devices.

Such pre-loaded module may facilitate assembly of the energy storage or transformation devices into the inner housing space. Stated differently, according to the invention, a pre-loaded module is provided, the pre-loaded module being configured for a wheelbase structure in accordance with the first aspect of the invention, and comprises the internal channel, cabling and/or heat transfer piping and a connection interface configured to connect the cabling and/or heat transfer piping to the energy storage or transformation devices. According to at least one example embodiment, the energy storage or transformation devices are included in the pre-loaded module.

According to at least one example embodiment, the sandwich structure comprises at least 2 layers, wherein adjacent layers are selected from different materials.

Hereby, a strong, yet cost effective, structure can be achieved. Thus, an outer boundary enclosing an inner housing space, may be formed which is strong and having great stiffness characteristics. According to at least one example embodiment, the sandwich structure comprises at least 3 layers, wherein adjacent layers are selected from different materials. According to at least one example embodiment, the sandwich structure comprises 2-4 layers, or 2-5 layers, wherein adjacent layers are selected from different materials.

According to at least one example embodiment, the sandwich structure comprises an outer metal layer, and an internal core comprising a foam or insulation layer.

Thus, great strength and stiffness is provided by the metal layer, and great weight and crash resistance are provided by the combination of an internal core of foam or insulation, and an outer metal layer. For example, the sandwich structure comprises two external layers being outer metal layers, and one internal core or internal layer, being a form or insulation layer. The metal may e.g. be aluminum or steel, and the foam or insulation material may be polyester-based, e.g. polyurethane.

According to at least one example embodiment, the sandwich structure is adapted to carry out a fire protection function and/or a mechanical stabilizing function.

In other words, the outer boundary comprises said portion formed by the sandwich structure is adapted to carry out a fire protection function and/or a mechanical stabilizing function.

According to a second aspect of the invention, a vehicle is provided. The vehicle comprises an engine configured to be powered by a plurality of energy storage or transformation devices, a first axle and a second axle separated along a longitudinal direction, and a vehicle main supporting structure forming at least a wheelbase structure according to the first aspect of the invention.

Effects and features of the second aspect of the invention are largely analogous to those described above in connection with the first aspect of the invention. Embodiments mentioned in relation to the first aspect of the invention are largely compatible with the second aspect of the invention, of which some are exemplified below. Hereby, an improved vehicle with a wheelbase structure for housing energy storage or transformation devices is provided. Thus, the object of the present invention is at least achieved by the second aspect of the present invention.

Thus, the wheelbase may structurally connect the first and second axles, e.g. by rigidly connecting the first axle housing with the second axle housing. The first axle may e.g. be a front axle of the vehicle, and the second axle may be a rear axle of the vehicle, e.g. a first rear axle of the vehicle. The first and second axles are preferably configured for holding propulsion means, such as e.g. wheels. The first and second axles may be referred to as propulsion axles, in the sense that they are configured for holding propulsion means. According to at least one example embodiment, at least one of the first and second axles is a drive axle.

According to at least one example embodiment, said portion of the wheelbase structure formed by the sandwich structure forms an integral part of the main vehicle supporting structure.

Hereby, the sandwich structure, being of relatively low weight but yet strong and having a high impact resistant, forms an integral part of the main vehicle supporting structure, while also providing for the inner housing space and the housing of the energy storage or transformation devices.

According to at least one example embodiment, said portion formed by the sandwich structure extends in the longitudinal direction along at least a majority of the distance between the first and second axles, such as at least along more than 50% of the distance between the first and second axles.

Hereby, the advantageous effects of the sandwich structure may be utilized to a large extent. According to at least one example embodiment said portion formed by the sandwich structure extends in the longitudinal direction along at least a majority of the distance between the first and second axles, such as along at least more than 60%, or 70%, or 80%, or 90% of the distance between the first and second axles.

According to at least one example embodiment, the vehicle further comprises the energy transformation devices arranged in the inner housing space, the energy transformation devices being batteries, fuel tanks or fuel cells.

According to at least one example embodiment, the engine is an electric machine. Thus, the vehicle may be referred to as an electric vehicle.

The fuel tanks may be gas or liquid fuel tanks, e.g. hydrogen tanks. For embodiments in which the energy storage or transformation devices are batteries, each battery comprises a plurality of battery cells housed in a separate battery casing.

It should be understood that the inner housing space formed by the outer boundary of the wheelbase structure may be used for other components than the energy storage or transformation devices, e.g. auxiliary components or auxiliary loads, and fuel cell stacks.

Further advantages and features of the present disclosure are disclosed and discussed in the following description and the accompanying drawings.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
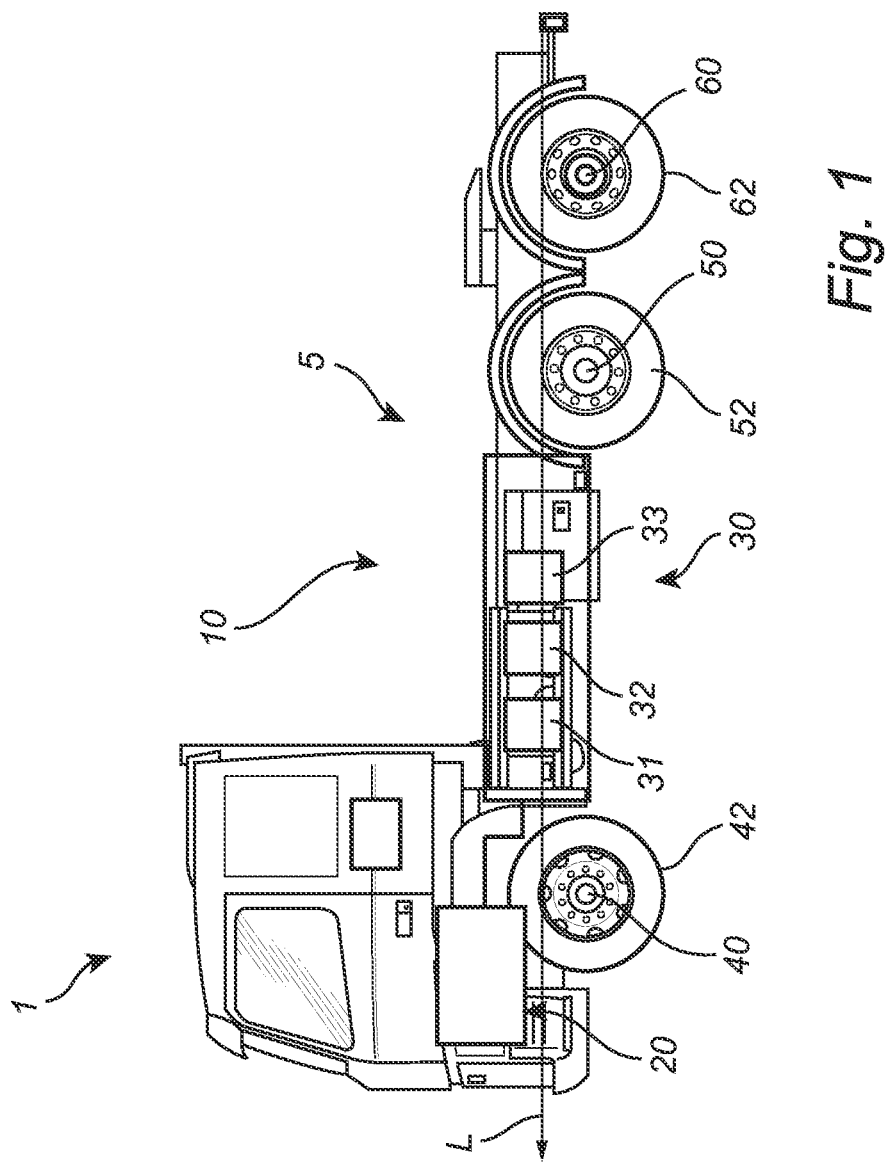
FIG. 1 is a side schematic view of a vehicle comprising a wheelbase structure having an inner housing space housing a plurality of energy storage or transformation devices in accordance with an example embodiment of the invention.

With reference to FIG. 1 a vehicle 1, here embodied as a heavy duty truck 1, is disclosed for which a wheelbase structure 10 of a kind disclosed in the present disclosure is advantageous. However, such wheelbase structure may as well be implemented in other types of vehicles, such as in busses, light-weight trucks, passenger cars, etc. The vehicle 1 is typically an electric vehicle 1, such as a full electric vehicle or a hybrid, comprising a plurality of energy storage or transformation devices 30, e.g. batteries or fuel cells, supplying a motor or engine 20 with energy. For the electric vehicle 1, the motor or engine is an electric machine 20, powered by batteries 30. The batteries 30 may be charged using an electric cable, or may be wirelessly charged using a wireless charging device, connected to an electrical energy source, e.g. a power grid. The vehicle in FIG. 1 further comprises a first axle 40, a second axle 50 and a third axle 60 arranged separated along a longitudinal direction L of the vehicle 1. The first axle 40 is in FIG. 1 a front axle 40, preferably a drive axle 40, comprising propulsion means 42 embodied as front wheels 42. The second axle 50 is a first rear axle 50, which may or may not be a drive axle, comprising propulsion means 52 embodied as first rear wheels 52, and the third axle 60 is a second rear axle 60, which may or may not be a drive axle, comprising propulsion means 62 embodied as second rear wheels 62.

Moreover, the vehicle 1 of FIG. 1 comprises a vehicle main supporting structure 5, which may comprise a vehicle supporting frame or chassis, to which components of the vehicle 1 are supported and attached. Between the first axle 40 and the second axle 50, the vehicle main supporting structure 5 forms a wheelbase structure 10. The wheelbase structure 10 rigidly connects a housing of the first axle 40 with a housing of the second axle 50, and thus extends from the first axle 40 to the second axle 50, and will now be further described with reference to FIGS. 2 and 3.

Figure 2:
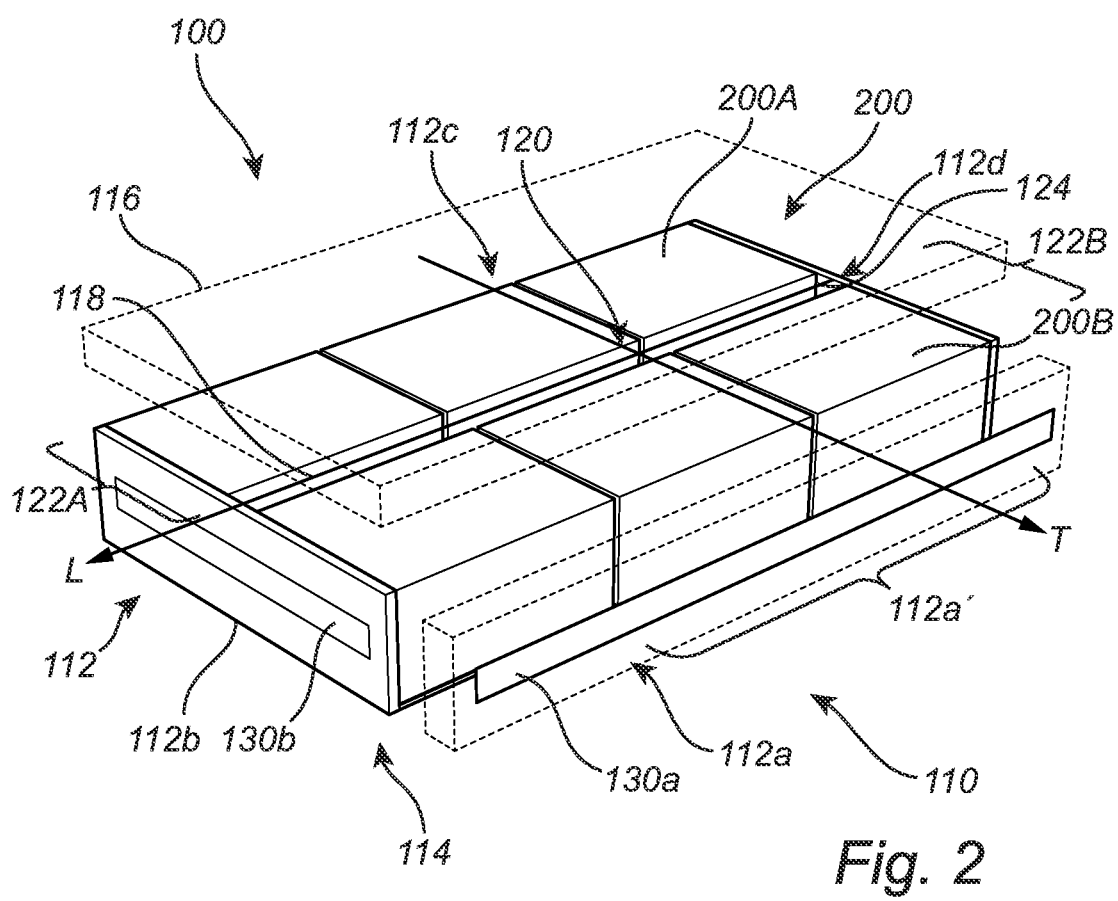
FIG. 2 is a perspective, partly exploded, schematic view of a wheelbase structure housing a plurality of energy storage or transformation devices in accordance with an example embodiment of the invention.

FIG. 2 discloses a wheelbase structure 100, which e.g. may be used as the wheelbase structure 10 of FIG. 1. The wheelbase structure 100 is thus configured to form at least a part of a vehicle main supporting structure by extending from a first axle to a second axle of the vehicle. The wheelbase structure 100 extends at least in the longitudinal direction L of the wheelbase structure (which typically coincides with the longitudinal direction L of the vehicle to which the wheelbase structure 100 is associated). In FIG. 2, the wheelbase structure 100 comprises an outer boundary 110 forming an inner housing space 120 for holding energy storage or transformation devices 200 (which e.g. may be batteries or fuel cells as previously disclosed).

The outer boundary 110 of FIG. 2 is rectangular, or box-shaped, and comprises a bottom wall 114, a top wall 116, and a side wall 112. The bottom wall 114 is arranged and configured to support the energy storage or transformation devices 200, i.e. the bottom wall 114 comprises a surface which the energy storage or transformation devices 200 are to rest upon when being housed in the inner housing space 120. The outer boundary 110 further comprises a top wall 116 arranged opposite the bottom wall 114, the top wall 116 being configured to seal the inner housing space 120. The top wall 116 may e.g. form part of a floor of the vehicle. The side wall 112 is divided into four side walls, or side wall portions in FIG. 2, circumferentially enclosing the inner housing space 120, and comprises a first side wall 112a extending along the longitudinal direction L, and a second side wall 112b extending traverse the longitudinal direction L (i.e. in a transverse direction T) and forming a perpendicular corner together with the first side wall 112a, a third side wall 112c arranged parallel and transversely separated to the first side wall 112a, and a fourth side wall arranged parallel and longitudinally separated to the second side wall 112b. In other words, the side wall 112 may be commonly referred to as the side walls 112. Thus, the wheelbase structure 110 and the outer boundary 112 forms a container, compartment or box, configured to house the energy storage or transformation devices 200. In FIG. 2, the top wall 116 and first side wall 112a are shown as partly exploded, and being transparent for enhanced visibility and understanding of the inner housing space 120. It should be noted that other shapes of the wheelbase structure 100 than the rectangular or box-shaped embodiment shown in FIG. 2 is within the scope of the invention. For example, the outer boundary 110 may form a spherical inner housing space or a spheroid. According to another example, the outer boundary 110 may form a cylindrical inner housing space, by first and second lateral walls arranged in parallel and separated along the longitudinal direction L, and an enveloping cylindrical wall extending between the first and second lateral walls long the longitudinal direction L.

Figure 3:
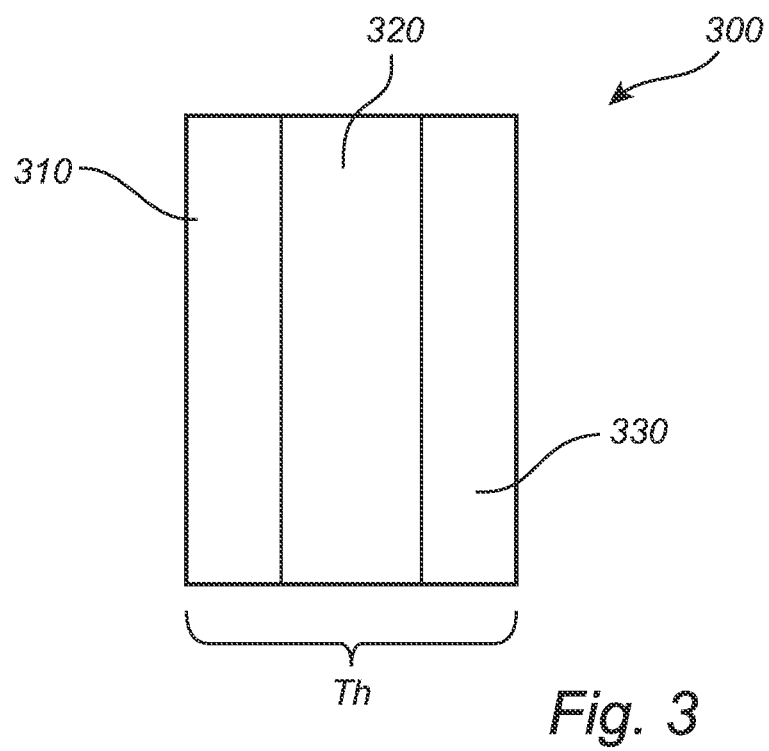
FIG. 3 is a schematic detailed side view of a portion formed by a sandwich structure in accordance with another example embodiment of the invention.

At least a portion of the outer boundary 110 of the wheelbase structure 100 is formed by a sandwich structure 300 comprising a plurality of layers of different materials 310, 320, 330, which will be further described with reference to FIG. 3. In FIG. 3, an example sandwich structure 300 is shown having a thickness Th, which e.g. may extend along the transversal direction T for embodiments in which the sandwich structure 300 is used for first side wall 112a and/or third side wall 112c. As shown in FIG. 3, the sandwich structure 300 is formed by three layers, a first layer 310, a second layer 320 and a third layer 330. The first layer 310 is an external layer, and may be arranged in the wheelbase structure 100 facing inwards towards the inner housing space 120, and the third layer 330 is an external layer, and may be arranged in the wheelbase structure 100 facing away from the inner housing space 120, i.e. away from the wheelbase structure 100. The second layer 320 is arranged between the first and third layers 310, 330, and may thus be referred to as in internal layer or an internal core. It should be noted that adjacent layers 310, 320, 330 in the sandwich structure 300 of FIG. 3 are selected from different material. In FIG. 3, this is embodied by that at least the second layer 320 is selected from a different material than the first and third layers 310, 330, the latter two layers being e.g. selected from the same material. For example, the second layer 320 may be a foam or insulation-based layer, and the first and third layers 310, 330 may be metal layers. According to at least one example embodiment, all layers, such as all three layers, or at least three layers of all layers in the sandwich structure, are selected from the same material.

Turning back to FIG. 2, the portion of the outer boundary 110 of the wheelbase structure 100 formed by a sandwich structure may e.g. be at least the side walls 112, or one, two or three of the side walls 112, such as e.g. the first side wall 112a and the third side wall 112c. According to at least one example embodiment, the complete outer boundary 110, i.e. the bottom wall 114, the top wall 116 and the side walls 112, is formed by the sandwiched structure. For example, embodiments different to the rectangular wheelbase structure 100 of FIG. 2, e.g. the cylindrically shape previously described, the portion of the outer boundary from a sandwich structure may e.g. be the enveloping cylindrical wall.

As also shown in FIG. 2, only a portion 112a' of the first side wall 112a, extending at least more than 50% of the wheelbase structure 100, may be formed by the sandwich structure 300. Alternatively, the portion of the outer boundary 110 forming the inner housing space 120 (i.e. here in bottom wall 114, the top wall 116 and the side walls 112), may extend along at least more than 50% of the wheelbase structure 100, while another structure not defining the inner housing space 120, contributes to the remaining portion in the longitudinal direction L (i.e. less than 50%).

The wheelbase structure 100 of FIG. 2 further comprises impact protection elements 130a, 130b in the form of a first impact protection element 130a arranged externally of the first side wall 112a, and thus externally of any sandwich structure 300 of the first side wall 112a, and a second impact protection element 130b arranged externally of the second side wall 112b, and thus externally of any sandwich structure 300 of the second side wall 112b. Any one of the other side walls 112, bottom wall 114 or top wall 116, may be arranged with corresponding impact protection elements. As seen in FIG. 3, the width, or height, of the impact protection elements 130a, 130b are by at least one magnitude smaller than the width, or height, of the corresponding side walls 112a, 112b.

Figure 4:
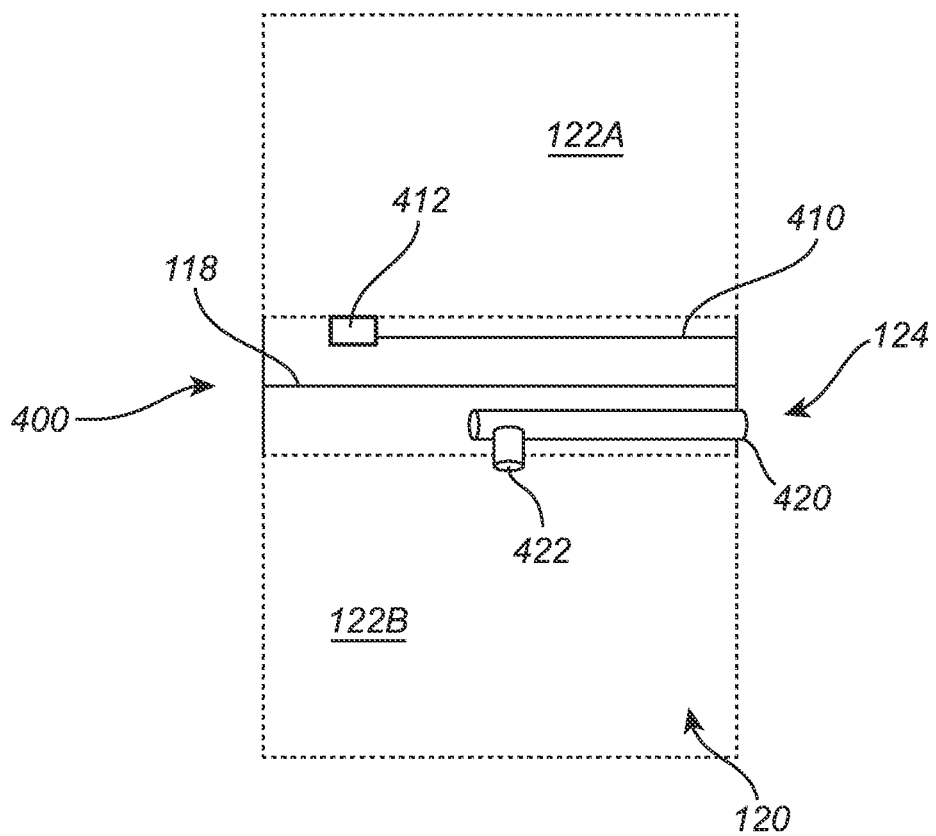
FIG. 4 is a schematic top view of a portion of a wheelbase structure, e.g. in the form of pre-loaded module, in accordance with one example embodiment of the invention.

FIG. 4 discloses a schematic detailed top view of a portion of the wheelbase structure 100 including the inner housing space 120 of FIG. 2, which may be arranged as a separate module 400. In FIG. 4, an internal wall 118 (i.e. internal relative the bottom wall 114, top wall 116 and side walls 112) separates the inner housing space 120 into separate compartments, here a first compartment 122A and a second compartment 122B (as also shown in FIG. 3). Each compartment 122A, 122B may e.g. be sized and dimensioned to house a respective energy storage or transformation device 200. The internal wall 118 is in FIG. 4 arranged and configured to form an internal channel 124 arranged in between the first and second compartments 122A, 122B (e.g. forming a first channel portion between the internal wall 118 and a first energy storage or transformation device housed in the first compartment 122A, and a second channel portion between the internal wall 118 and a second energy storage or transformation device housed in the second compartment 122B). The internal channel 124 houses cabling 410 and heat transfer piping 420 for connection to the energy storage or transformation devices 200. As schematically illustrated in FIG. 4, the cabling 410 comprises a cabling connection interface 412 to an energy storage or transformation device to be housed in the first compartment 122A, and the heat transfer piping 420 comprises a piping connection interface 422 to an energy storage or transformation device to be housed in the second compartment 1228. As shown in FIG. 4, the module 400 may be preloaded with the cabling 410, the heat transfer piping 420 and the respective connection interfaces 412, 422, and may thus be prepared for the connection possibility to energy storage or transformation devices. The internal channel 124 may furthermore be used for routing between the front and rear part of the vehicle 1 (including any media, electrical/pneumatic/hydraulic). Alternatively, the internal wall comprises two parallel internal walls wherein the internal channel 124 is formed between the parallel internal walls.

It should be noted that further internal wall (not shown) may be arranged perpendicular to the internal wall 118, such further internal wall further separating the first and second compartments 122A, 122B improving e.g. the fire protection function. Any internal wall contributes to an increased rigidity and mechanical stabilizing function, and any internal wall may partly, or fully, be formed by the sandwich structure 300 of FIG. 3.

Turning back to FIG. 1, the wheelbase structure 10, e.g. being the wheelbase structure 100 described with reference to FIG. 2, thus forms a part of the vehicle main supporting structure 5. Thus, the portion formed by the sandwich structure 300 (e.g. portion 112a', at least one of the side walls 112, the bottom wall 114, and/or the top wall 116) forms an integral part of the main vehicle supporting structure 5. As seen in FIG. 1, the outer boundary of the wheelbase structure 10 extends in the longitudinal direction L along at least a majority distance between the first and second axles 40, 50, such as at least more than 50% of the distance between the first and second axles 40, 50.

It is to be understood that the present invention is not limited to the embodiments described above and illustrated in the drawings; rather, the skilled person will recognize that many changes and modifications may be made within the scope of the appended claims.

Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. The steps of any method disclosed herein do not have to be performed in the exact order disclosed, but may so according to at least one example embodiment.

The invention claimed is:

1. A wheelbase structure forming at least a portion of a vehicle main supporting structure by extending from a first axle to a second axle separated along a longitudinal direction, the wheelbase structure rigidly connecting a first axle housing and a second axle housing of the vehicle without an interposing ladder frame coupling the first axle housing to the second axle housing, the wheelbase structure comprising:
   at least one longitudinal frame member extending between the first axle and the second axle; and
   an outer boundary comprising a top boundary surface, a bottom boundary surface, and a plurality of side boundary surfaces extending between the top boundary surface and the bottom boundary surface, wherein the outer boundary forms an inner housing space bounded by the outer boundary, and wherein the inner housing space is formed as a box, compartment, or container for housing energy storage or transformation devices, with the top boundary surface and the bottom boundary surface being parallel to each other,
   wherein:
   at least a portion of the outer boundary extends in the longitudinal direction along at least a majority of the wheelbase structure,
   at least one side boundary surface of the outer boundary comprises a side wall that extends in the longitudinal direction, the side wall being formed by the at least one longitudinal frame member, and
   the side wall is formed by a sandwich structure comprising two external layers being outer metal layers and an internal core comprising a foam or insulation layer, wherein one of the external layers faces inwards towards the inner housing space and the other one of the external layers faces away from the inner housing space.

2. The wheelbase structure of claim 1, wherein the outer boundary further comprises at least a bottom wall forming the bottom boundary surface for supporting the energy storage or transformation devices and a top wall forming the top boundary surface for sealing the inner housing space.

3. The wheelbase structure of claim 2, further comprising an impact protection element arranged external to the side wall.

4. The wheelbase structure of claim 1, further comprising at least one internal wall separating the inner housing space into separate housing compartments, wherein the at least one internal wall is formed by the sandwich structure.

5. The wheelbase structure of claim 4, wherein the at least one internal wall forms an internal channel for cabling and/or heat transfer piping for the energy storage or transformation devices.

6. The wheelbase structure of claim 5, wherein the internal channel forms a part of a pre-loaded module comprising cabling and/or heat transfer piping and a connection interface configured to connect the cabling and/or heat transfer piping to the energy storage or transformation devices.

7. The wheelbase structure of claim 1, wherein the sandwich structure is configured to carry out a fire protection function and/or a mechanical stabilizing function.

8. A vehicle, comprising:
- an engine configured to be powered by a plurality of energy storage or transformation devices,
- a first axle housed in a first axle housing and a second axle housed in a second axle housing, the first axle and the second axle being separated along a longitudinal direction, and
- a vehicle main supporting structure forming a wheelbase structure, the wheelbase structure rigidly connecting the first axle housing and the second axle housing and comprising:
  - at least one longitudinal frame member extending between the first axle and the second axle; and
  - an outer boundary comprising a top boundary surface, a bottom boundary surface, and a plurality of side boundary surfaces extending between the top boundary surface and the bottom boundary surface, wherein the outer boundary forms an inner housing space bounded by the outer boundary, and wherein the inner housing space is formed as a box, compartment, or container for housing energy storage or transformation devices, with the top boundary surface and the bottom boundary surface being parallel to each other, wherein:
- at least a portion of the outer boundary extends in the longitudinal direction along at least a majority of the distance between the first and second axles,
- at least one side boundary surface of the outer boundary comprises a side wall that extends in the longitudinal direction, the side wall being formed by the at least one longitudinal frame member,
- the side wall is formed by a sandwich structure comprising two external layers being outer metal layers and an internal core comprising a foam or insulation layer, wherein one of the external layers faces inwards towards the inner housing space and the other one of the external layers faces away from the inner housing space, and
- the vehicle is devoid of a ladder frame connecting the first axle housing to the second axle housing.

9. The vehicle of claim 8, further comprising the energy transformation devices arranged in the inner housing space, the energy transformation devices comprising batteries, fuel tanks, or fuel cells.

10. The vehicle of claim 8, wherein at least one of the first and second axles is a drive axle.

* * * * *